B. ROUS.
NECK MAKING MACHINE.
APPLICATION FILED FEB. 7, 1912.

1,073,713.

Patented Sept. 23, 1913.
8 SHEETS—SHEET 2.

Fig 2

Witnesses:
P. W. Hubbe
Anna Slutsky

Inventor
Bernard Rous
By his Attorney
A. H. de Bonneville

B. ROUS.
NECK MAKING MACHINE.
APPLICATION FILED FEB. 7, 1912.

1,073,713.

Patented Sept. 23, 1913.

Witnesses:
P. W. Huffe
Anna Slutsky

Inventor
Bernard Rous
By his Attorney
A. A. de Romeville

B. ROUS.
NECK MAKING MACHINE.
APPLICATION FILED FEB. 7, 1912.

1,073,713.

Patented Sept. 23, 1913.
8 SHEETS—SHEET 4.

Fig 5.

WITNESSES:
P. W. Hubbe
Anna Slutsky

INVENTOR
Bernard Rous
BY
A. A. de Romeville
ATTORNEY

B. ROUS.
NECK MAKING MACHINE.
APPLICATION FILED FEB. 7, 1912.

1,073,713.

Patented Sept. 23, 1913.
8 SHEETS—SHEET 6.

INVENTOR
Bernard Rous
BY
A. A. de Bonneville
ATTORNEY

Witnesses
P. W. Hubbe
Anna Slutsky

B. ROUS.
NECK MAKING MACHINE.
APPLICATION FILED FEB. 7, 1912.

1,073,713.

Patented Sept. 23, 1913.
8 SHEETS—SHEET 7.

B. ROUS.
NECK MAKING MACHINE.
APPLICATION FILED FEB. 7, 1912.

1,073,713.

Patented Sept. 23, 1913.

Witnesses:
P. W. Habbe
Anna Slutshy

Inventor
Bernard Rous
By his Attorney
A. N. de Bomeville

COLUMBIA PLANOGRAPH CO., WASHINGTON, D. C.

UNITED STATES PATENT OFFICE.

BERNARD ROUS, OF BROOKLYN, NEW YORK, ASSIGNOR TO LOUIS HEFTER, OF NEW YORK, N. Y.

NECK-MAKING MACHINE.

1,073,713.  Specification of Letters Patent.  Patented Sept. 23, 1913.

Application filed February 7, 1912. Serial No. 676,083.

*To all whom it may concern:*

Be it known that I, BERNARD ROUS, a citizen of the United States, and a resident of the borough of Brooklyn, in the county of Kings and State of New York, have invented certain new and useful Improvements in Neck-Making Machines, of which the following is a specification.

This invention relates to machines for making the frames or body portions, commercially known as necks, of boxes.

The invention is an improvement of my application for neck making machines filed December 4th, 1911, Serial Number 663,824. The present application is particularly directed to improvements in the construction and functions of the forming block with its appurtenances to form the necks thereon, and also among other improvements, attention is called to the glue box with its appurtenances to evenly spread the glue or paste on the paper band which forms part of the neck.

In the accompanying drawings

The machine is shown to comprise the table 20 supporting the bracket 21 having the bearings 22, and in which latter is journaled the driving shaft 23. A collar 24 fastened to the shaft 23 is interposed between the bearings 22 to prevent the lateral displacement of said shaft. A tight pulley 28 is fastened to the shaft 23 and a loose pulley 29 is journaled thereon. A balance wheel 30 with the operating handle 31 is fastened to the shaft 23, and a pinion 32 is also fastened to said shaft.

Journal brackets 35, 36 and 37 are fastened to and extend up from the table 20, and a cam shaft 40 is journaled in said three brackets. A spur gear 41 is fastened to the shaft 40 and meshes with the pinion 32. A cam drum 43 with the groove cams 44, 45, 46 is fastened to the shaft 40. A journal bracket 48 with a plurality of bearings and a similar journal bracket 49 with a plurality of bearings are supported on the table 20. Spindles 50, 51, 52 are supported in the accompanying bearings of the brackets 48 and 49. To the spindle 50 are fastened the arms 55 and 56, to the spindle 51 are fastened the arms 57 and 58, and to the spindle 52 are fastened the arms 59 and 60. The arms 55, 57 and 59 have respectively journaled at their upper ends the rollers 61, 62 and 63 which latter respectively engage the groove cams 44, 45 and 46. On the table 20 are supported the journal brackets 65 and 66 in which is journaled the spindle 67. At one end of the spindle 67 is fastened the arm 68 to which latter is journaled the roller 69. A cam 70 with the groove cam 71 is supported on the shaft 40, the groove 71 engaging the roller 69. On the other end of the spindle 67 is fastened the arm 72. On the table 20 is supported the journal bracket 75 in which is journaled the sleeve 85. An outer sleeve 86 that has fastened thereto the disk toe 87, which can register with a disk 88 fastened to the sleeve 85 in the circumferential surface of which is formed a notch 89 and heel 90.

A cam 91 is fastened to the cam shaft 40. A double bracket with the lugs 92, 93 is supported on the table 20. A lever 94 is pivoted on a pin 95 supported in the lug 92. One end of the lever 94 has journaled thereto a roller 96 that engages the cam 91 and at the other end thereof is formed a toe 97 that can register with the notch 89. A spring 98 connects the lever 94 and a hook extending from the table 20.

A sector 100 is fastened to the shaft 40 and can mesh with the gear 101 journaled on a pivot secured in the lug 93. A gear 103 is connected to the sleeve 85 and meshes with the gear 101.

A second or intermediate tubular sleeve 110 is slidably supported in the sleeve 86, and a third or inner sleeve 111 is slidably supported in the sleeve 110. A plunger rod 112 is slidably supported within the sleeve 111.

A bracket 115 secured upon the table 20 supports one end of the plunger rod 112. A supplemental bracket 116 is fastened to the bracket 115. An arm 117 has one end fastened to the rod 112, and the other end of the arm carries a stop pin 118 which extends through the supplemental bracket 116, whereby the plunger rod 112 is enabled to reciprocate but is prevented from turning.

A sleeve bracket 120 recessed at 121 is fastened to the plunger rod 112. The bracket 120 carries a pin 122 for one end of the link 123, the other end of which latter by means of the pin 124 is pinned to the arm 56, and by virtue of the connections of said arm with the cam drum 43 the plunger rod 112 receives its requisite reciprocations.

On the sleeve 86 are fastened two pairs of split collars 128, with the end flanges 129 and the inner annular flanges 130, which latter register with corresponding annular grooves in the said sleeve 86. Upon the outer cylindrical surfaces of the split collars are forced clamping rings 131. A sleeve bracket 134 recessed at 135 is supported upon the outer sleeve 86 between the flanges 129 of the split collars 128. The bracket 134 carries a pin 136 for one end of the link 137, the other end of which latter by means of the pin 138 is pinned to the arm 72, and by virtue of the connections of said arm with the cam drum 43 the outer sleeve 86 receives its requisite reciprocations.

On the sleeve 110 are fastened two pairs of split collars 142 with the end flanges 143, and the inner annular flanges 144, which latter register with corresponding annular grooves in the second sleeve 110. Upon the outer cylindrical surfaces of the split collars 142 are forced clamping rings 145. A sleeve bracket 146 recessed at 147 is supported upon the sleeve 110 between the flanges 143 of the split collars 142. The bracket 146 carries a pin 150 for one end of the link 151, the other end of which latter by means of the pin 152 is pinned to the arm 60, and by virtue of the connections of said arm with the cam drum 43 the second sleeve 110 receives its requisite reciprocations.

On the third sleeve 111 are fastened two pairs of split collars 156 with the end flanges 157 and the inner annular flanges 158 which latter register with corresponding annular grooves in the said third sleeve. Upon the outer cylindrical surfaces of the split collars 156 are forced clamping rings 160. A sleeve bracket 161 recessed at 162 is supported upon the third sleeve 111 between the flanges 157 of the split collars 156. The bracket 161 carries a pin 163 for one end of the link 164, the other end of which latter by means of the pin 165 is pinned to the arm 58. By virtue of the connections of the arm 58 with the cam drum 43, the third sleeve 111 receives its requisite reciprocations. The second or intermediate tubular sleeve 110 has fastened thereto the hollow rectangular guide box 169 with the fingers 170. Its rear wall 171 contains a guide opening for the guide and driving rod 172, which latter extends through a guide opening in the toe 87 and has one end thereof fastened to the disk 88. In the rear wall 171 of the guide box 169 is formed an opening 173 in which is secured a thimble 174 with the end wall 175. A plunger 176 is located within the opening 173 and extends through an opening in the end wall 175. A lever 180 has one end pinned to the plunger 176 by means of the pin 181, and the other end thereof is pinned to the arm 182 of the clamping toe 183, having a facing of rubber 184 by means of the pin 185. The said toe is pivoted by means of the hinge pin 186 to the hinge bracket 187. A U shaped guide bracket 188 extends from the said hinge bracket 187 to guide the lever 180. A spring 190 encircles the plunger 176 and bears between the wall 175 and one end of the lever 180. To the third or inner sleeve 111 is fastened the rectangular forming block 193, which has an opening for the guide and driving rod 172. It is slidably supported in the guide box 169, and has a cavity in which is pivoted a catch 195 the end of the latter extending out of the guide block in its normal position. A spring 196 bears between a wall of the cavity and said catch.

A rectangular carrier 200 has formed therewith the cylindrical sleeve 201 that is supported on the plunger rod 112. A pin 202 extends through said rod and engages notches in the sleeve 201 at one end of the latter, and a nut on a reduced diameter 203 of the rod 112 bears against the other end of said sleeve 201. On the cam shaft 40 is fastened a cam 206. A bearing 207 extends from the table 20 and carries a pin 208 on which is pivoted a lever 209. A roller 210 is journaled on the lever 209 and engages the cam 206. A spring 211 extends between the lever 209 and the column 301 to be described. From the lever 209 extends the supporting arm 215 which adjustably supports the plate 216. Elongated openings 217 are formed in the plate 216 and guide screws 218 extend through said openings and are in threaded engagement with the supporting arm 215. A pivot 220 with a split pin 221 extends from the plate 216. A ball 224 is journaled on the pivot 220. A bell crank with the arms 225, 226 is pivoted on a pin 227 supported in the column 301. On the end of the arm 226 is journaled a roller 228 that engages a cam 229 supported on the cam shaft 40. The arm 225 has formed therewith the dovetailed guide block 230. A pair of longitudinal grooves 231 each with a depending leg 232 are formed in said guide block 230. A spring 233 extends between the arm 225 and the table 20. A cross-head 236 is slidably carried in the dovetail of the guide block and supports a pair of shears, that comprise the cutting members 237 each with an arm 238. The arms 238 have each extending therefrom the rollers 239 that are engaged by the grooves 231. A spring 240 on the cross-heads maintains the cutting edges of the cutting members in proper position. A spring 241 bears between the rear face of the cross-head 236 and the accompanying face of the guide block 230. A pivot 244 with the split pin 245 extends from the cross-head 236 and on which is journaled a ball 246.

Screw pins 247 are carried on the ball 224 and screw pins 248 are carried on the ball 246, and a link 250 is pivoted on the said pins 247 and 248.

A closer designated generally by the numeral 255 is located upon the table 20 so that it can coact with the carrier 200. It comprises the cover plate 256 with the foot 257, the cover plate 258 with the foot 259. Annular guide plates 260, 261 with the central division plate 263 are secured between said cover plates. An annular groove 264 is formed in the guide plate 260, and on the surface of said plate adjacent to the division plate 263 are formed four recesses 265. Openings 266 connect the groove 264 with the recesses 265. A ring 267 with four elongated openings 268 having straight sides is located in the annular groove 264. Bending bars 270 have the tapered ends 271 and shanks 272 which latter are located in the recesses 265. Pins 273 extend from the shanks 272 and are engaged with the openings 268.

In the annular guide plate 261 is formed an annular groove 274 similar to 265, and on the surface of said plate adjacent to the division plate 263 are formed four recesses 275. Openings 276 connect the groove 274 with the recesses 275. A ring 278 with the four curved elongated openings 279 is located in the annular groove 274. Four pressing bars 280 have the shanks 281 with pins 288 that engage the recesses 275. Each of the said pressing bars has flexibly connected thereto a pressing plate 282, by means of screws 283 which are in threaded engagement with the plates 282 and are slidably connected with the pressing bars 280. Springs 284 bear between the bars 280 and the plates 282. The shank 281 at the uppermost portion of the closer is suspended by means of the spring 285, one end of which is connected to a ring bolt 286 extending from said shank and with the other end thereof connected to a hook 287 extending from the guide plate 251. An opening 290 is formed in the cover plate 256 and a similar opening 291 is formed in the cover plate 258. In each of the rings 267 and 278 opposite the openings 290 and 291 is supported a journal pin 292 which supports an eccentric disk 293 having the flange 294. A nut 295 engages the outer end of each disk 293, and a washer 296 is secured on the end of each journal pin 292 by means of a screw 297.

Columns 300, 301 extend up from the table 20 and carry the frame plate 302 with the opening 303. The plate 302 carries the uprights 304 and 305, which are connected by the upper tie braces 306, 307 and the lower tie braces 308, 309. The upright 304 has formed therein the slot 312 for the pusher block 313. A pusher plate 214 is carried on the block 313 by means of the screws 315. On the upright 304 is fastened a threaded bracket 316 with the adjusting screw 317 having the head 318. The said screw constitutes an adjustable stop for the pusher block 313.

A link 322 has one end pinned to the pusher block 313 and its other end is pinned to the lever 323, which in turn is pinned to the tie braces 307 by means of the pin 324. A spring 325 extends between the lever 323 and the brace 309. A bell crank with the arms 326 and 327 is pivoted to the lug 328 extending from the frame plate 302 by means of the pin 329ᵃ. The arm 326 carries a pin 329 which is pinned to one end of the link 330, and the latter by means of the pin 331 is connected to the lever 323. The arm 327 has journaled thereto the roller 332, which is in the path of the cam 333 on the cam shaft 40. To the uprights 304, 305 are fastened the legs 336, 337 of the guide bar 338. On the leg 336 is journaled a pulley 340 and on the leg 337 is journaled a pulley 341. A sliding carriage is supported on the guide bar 338, and comprises the side plates 345 connected by the filling blocks 346. A bracket 347 with a boss 348 extends from the plate 345 and has an opening for the spindle 350 of the pusher plate 351. A knurled head 352 extends from the pin 350. A pin 353 extends from the carriage and to it is fastened one end of band 356, that extends over the pulleys 341, 340 and the other end of said band carries the weight 357.

In the column 301 is supported a dovetailed guide 359 which slidably supports the carriage 360. The carriage 360 has extending therefrom the plate 360ª with the table 361 and the roller 362. The carriage 360 has pivoted thereon the bending arm 363 and on the latter is fastened a flexible plate or spring 364.

A pawl 368 is pivoted on the carriage 360 and is pinned to a link 369 which in turn is pinned to the lever 370. The lever 370 is pivoted on a pin 371 extending from the bracket 372, and has pivoted thereto the roller 373, which is in the path of the cam 374 fastened to the cam shaft 40. A spring 403 has one end fastened to the lower end of the lever 370 and its other end is fastened to a hook 404 extending from the table 20.

A bracket 380 has journaled therein a pin 381, from which extends a lever 382, and the latter has journaled at its upper end a roller 383 that bears against the cam 384 on the cam shaft 40. A link 385 has one end pinned to the lever 382 and the other end is pinned to one arm 386 of a bell crank having journaled thereto the forming roller 387. The said bell crank has the second arm 388. A pin 389 supported in bracket 390 carries the said bell crank. A lever 395 has one end pinned to the column 301 by means of the pin 396, and at the other end thereof is journaled the second forming roller 397. A link 398 with an elongated opening 399 connects about the central portion of the lever 395 with the pin 400 of the arm 388, the opening 399 engaging the pin 400. The rollers 387 and 397 are at predetermined intervals located in the path of the forming block 193. A spring 401 has one end fastened to the link 385 and its other end to a pin 402 extending from the table 20.

The table 20 supports a paste or glue box 410, by means of the flange 411 extending from said box. The box has formed therewith the side walls 412, 413 and the end walls 414, 415. The wall 412 has a lug 416 formed therewith having a journal bearing 417, and the wall 413 has fastened thereto the journal box 418. A shaft 420 has one end supported in the box 418, and at the other end a reduced portion is supported in the bearing 417. A hand wheel 421 is fastened to one end of the shaft 420, and at the other end of the shaft is fastened the paper strip cleaning blade 422.

In the wall 413 is journaled a pivot 427 having the handle 428 and the wheel cleaning blade 429. A shaft 430 with the handles 431 is journaled in bearings formed in the walls 412 and 413 of the glue box 410, and supports the glue wheel 432. A bracket 435 fastened to the end wall 415 of the glue box has journaled therein a guide roller 446. To the end wall 414 is fastened the bracket 447 which has journaled therein the guide roller 448. A support 452 adjustably fastened to the wall 413 carries a pin with a guide roller 453.

A bracket 456 extends from the glue box 410 and supports a pin 457, and on the latter are fastened a pair of wheels 458. Between the latter is located a reel of a paper band 459 in the usual way, on a tube 460 journaled on the pin 457. A leg 463 extends from the bracket 456 and supports a pin 464. An arm 465 with a counterweight 466 is fastened to the pin 464. A pressing finger 467 is also fastened to said pin 464 and bears on the reel of paper. In the bottom of the glue box is threaded a handle 470 for the purpose of emptying the glue box if necessary.

An arm 472 extends from the glue box 410, and has journaled at its outer end a sheave 473. An arm 475 extends from the upper face of the column 300 and has extending therefrom a guard 476 with a flange 477, that is located over the glue wheel 432. A link 478 with the notch 479 has its upper end pivoted to the upper end of the arm 475 by means of the pin 480. On the pin 481 of the bracket 482 is pivoted the lever 485, and in the upper end of the latter is pinned, by means of the pin 486, one end of the link 487. The other end of the link 487 is pinned to the link 478 by means of the pin 488. An arm 490 having the pin 491 is pivoted on the pin 480 of the arm 475. The lower end of the arm carries a pin 492 on which is journaled a roller 493. A guide disk 494 is carried on the pin 492. A rope 495 extends over the sheave 473 with one end fastened to the arm 490 and to the other end of the rope is attached the weight 491ª.

The arm 485 has journaled thereto a roller 496 which bears against a cam 497 fastened to the cam shaft 40.

A journal bracket 500 is fastened to the lower face of the table 20. A pin 501 is journaled in the bracket 500 and has pivoted thereto the lever 502. A roller 503 is journaled on the lever 502 which engages a groove cam 504.

A connecting rod 508 connects the upper end of the lever 502 with one of the eccentric disks 293. The pin 501 at the other end thereof carries an arm 509 to which is journaled a roller 510 that engages a groove cam 512 similar to 504. A connecting rod 513 connects the arm 509 with the other eccentric disk 293.

A counter 520 with the arm 521 is connected to the tie brace 307, and a link 522 connects the arm 521 with the lever 323.

Figure 21:
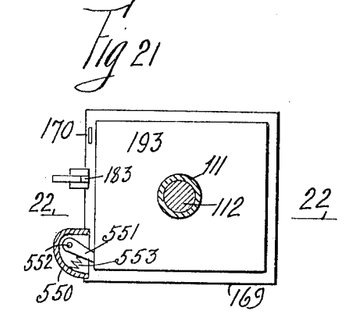
Fig. 21 shows an enlarged view similar to Fig. 12 with a modification and Fig. 22 is a top plan view and partial section of Fig. 21 on the line 22, 22.
Figure 22:
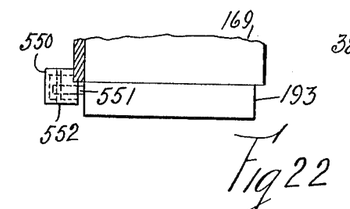

In Figs. 21, 22, the invention is modified by omitting the latch 195 from the forming block. The guide box 169 has formed therewith a hood 550, in which is pinned a catch 551 on a pin 552. A spring 553 bears between the inner surface of the hood and the forming block to pinch the neck that is being formed thereon. In this modified guide box one of the fingers 170 is also omitted. The clamping toe 183 is connected to the box as already described.

To operate the machine the paper band 459 is led from its reel over the roller 435 and glue wheel 432, which latter spreads a film of glue or paste on said band, the glue or paste being picked up in the glue box 410 and evenly spread thereon by the blade 429. The paper band then passes under the roller 453, over the scraping blade 422, next under the roller 448, and around the roller 493, over the roller 498 to the table 361. It is prevented from slipping backwardly by the pawl 368, which latter forces the band forwardly with the carriage 360. The band 459 next moves downwardly adjacent to the forming block 193 by the action of the bending arm 363 and its spring 364.

A plurality of card board strips 525 preferably notched at 526 to enable them to be shaped to form the necks or frames to be formed are located between the tie braces 306 and 307. The pusher plate 351 bears against said strips by virtue of the resulting effect of the weight 357 on the carriage having the side plates 345, maintaining them with the requisite frictional engagement between said pusher plate and the uprights 304, 305.

Figures 12, 13, 14, 15, 16, 17:
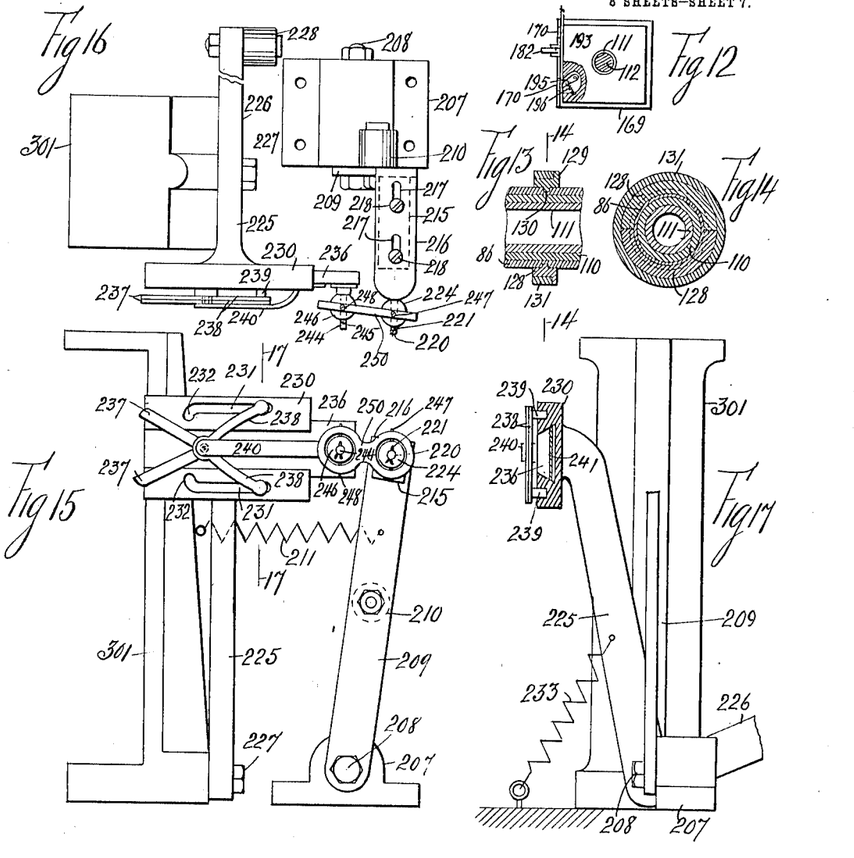
Fig. 12 represents a partial section of Fig. 11 on the line 12, 12, with the elements turned 180 degrees.
Fig. 13 shows an enlarged fragmentary portion of Fig. 11.
Fig. 14 is a section of Fig. 13 on the line 14, 14.
Fig. 15 shows an enlarged front view of the shears with their appurtenances.
Fig. 16 is a top plan view of Fig. 15.
Fig. 17 is a section of Fig. 15 on the line 17, 17, and a partial right hand view of Fig. 15.
Figure 18:
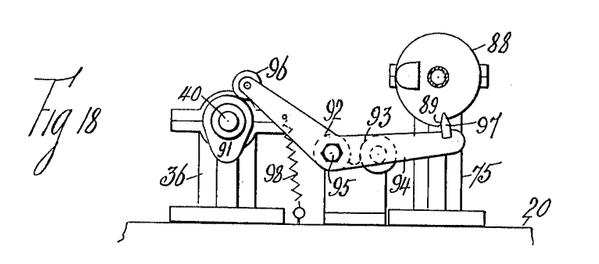
Fig. 18 represents an enlarged fragmentary section of Fig. 2 on the line 18, 18.

The shaft 23 is rotated by means of a belt not shown engaging the pulley 28. The pinion 32 and gear 41 transmit rotation to the cam shaft 40 and thereby the rollers 61, 62, 63 and 69 impart an oscillating motion to the pairs of arms 55—56, 57—58, 59—60, and 68—72. The said arms respectively reciprocate the plunger rod 112 and the sleeves 111, 110 and 86. After the said sleeves have respectively completed a forward and return stroke, they are turned one revolution by the action of the sector 100 on the gear 101, the latter transmitting rotation to the pinion 103. The lever 94 maintains the disk 88, and consequently the forming block in proper position for each cycle of operations, by reason of the toe 97 locking with the notch 89. The cam 91 controls the engagement of the toe 97 with the notch 89 when the pusher block 313 is rising to the upper end of its stroke and before pushing down the strip of card board thereunder the forming block with its appurtenances are located as shown particularly in Fig. 12. When the pusher block 313 descends the forming block 193 has rotated to bring the side thereof having the catch 195 extending therethrough in line with one face of the strip and is locked in position by the toe 97. The strips of card board travel to the lower end of said side of the block 193, being guided by the fingers 170 and are pinched by said catch 195. The finger 170 that is located adjacent to the catch 195 forms a support for the strip of the card board when pinched by said catch. The distance that the strips are pushed down is controlled by the location of the adjusting screw 317, the latter controlling the stroke of the pusher block 313. About the same time that the strip has been placed in position against the said side of the forming block, the roller 387 brings the glued paper band 459 against said strip of card board. The paper band is fed to the strip by the action of the pawl 368, feeding it toward the bending arm 363, from which latter it is located in proper position to be pushed against said strip by the action of the roller 387. The toe 87 next moves toward the forming block 193 and the heel 183 clamps the strip of card board with its band 459 thereon.

The forming block makes about a half of a revolution the heel 183 being released, and after the forming block has nearly made a complete revolution the band 459 is cut by the shears. While the forming block 193 is rotating the rollers 387, 397 are forcing the band and card board strip against the walls of the same. The forming block 193 with the guide box 169 now enter the closer, both the rollers 387 and 397 receding therefrom. The closer now begins its operations by bending bars 270 bending the paper band over the edge of the frame or neck that has been made from the strip. Next the plates 282 of the pressing bars 280 bear against the band and press it tightly against the strip. The forming block 193 with its appurtenances now recedes from the closer and at the same time the neck is gripped therein by said plates 282. The carrier 200 now enters the neck and forces the band 459 against the inner surface of the now rectangular card board strip or neck. Then the plates 282 of the closer are released from the neck and the carrier 200 carries them through the closer to be deposited on the chute 530.

Figure 1:
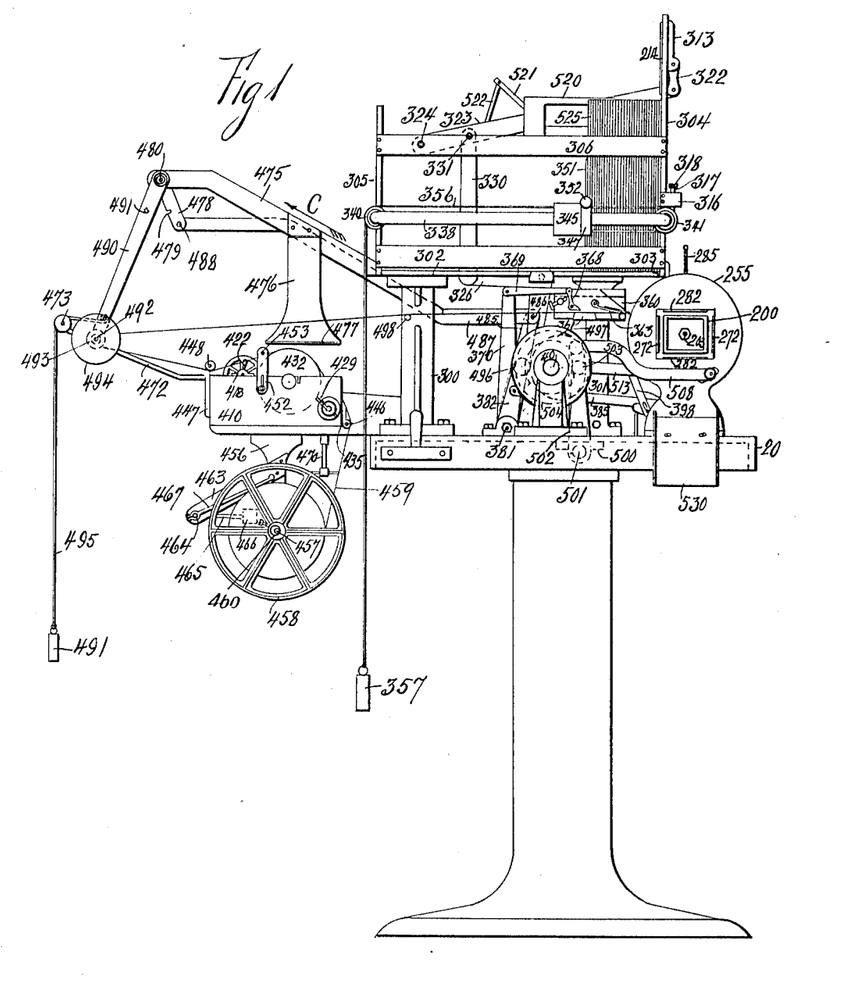
Figure 1 represents the front view of a machine exemplifying the invention.
Figure 2:
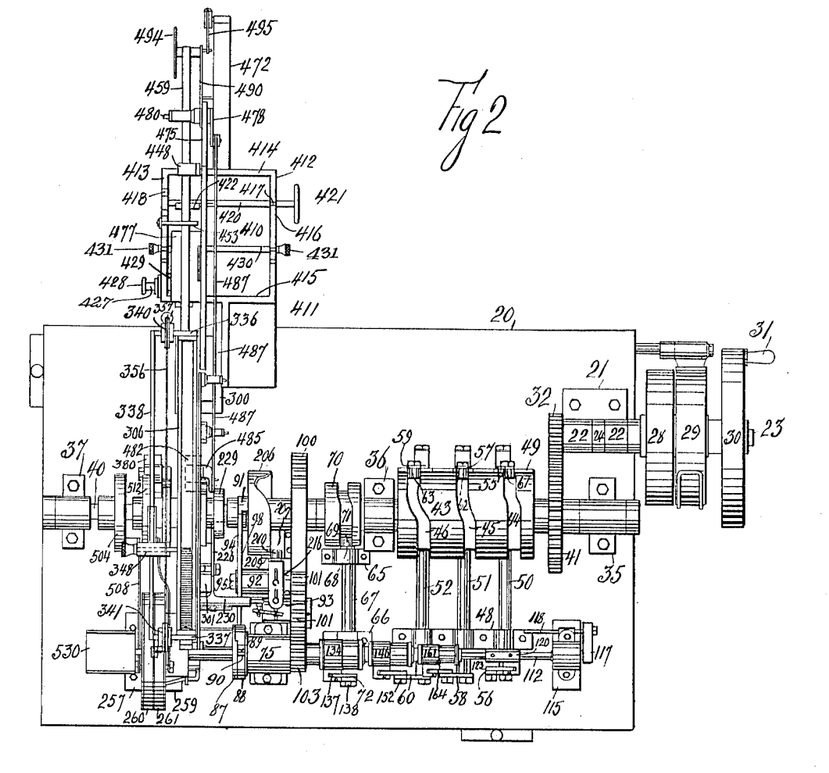
Fig. 2 shows a top plan view of Fig. 1.

While the paper band 459 is clamped by the pawl 368, the lever 485 by the action of the cam 497 causes the link 487 to move in the direction of the arrow C, Fig. 1, and the arm 479 engaging the pin 491 causes the link 490 with its roller 493 to move in the same direction. Thereby the paper band 495 is pulled from its reel. The arm 479 next recedes from the pin 491 and the band is maintained in its position by the weight 491$^a$. This function is provided so that when the band is again pulled, by the action of the pawl 368 with its carriage having the side plates 345, the paper is not then paid out from its reel but by the elevation of the weight 491. This is necessary by reason of the jerky motion given the band 459 by the rectangular form of the forming block 193.

Figure 3:
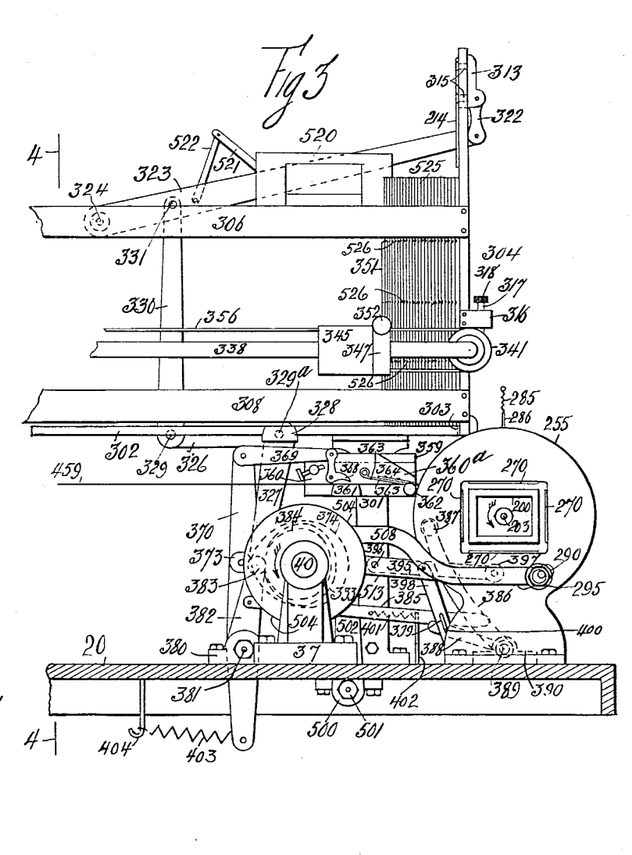
Fig. 3 is an enlarged fragmentary portion of Fig. 1.
Figure 4:
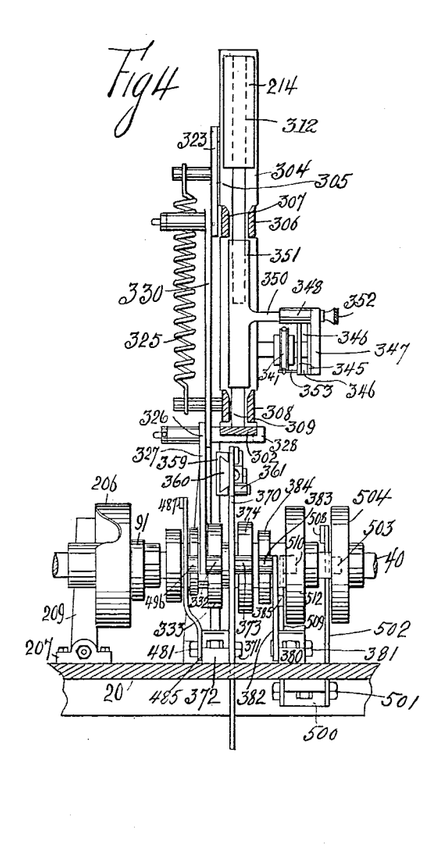
Fig. 4 shows a section of Fig. 3 on the line 4, 4.
Figure 5:
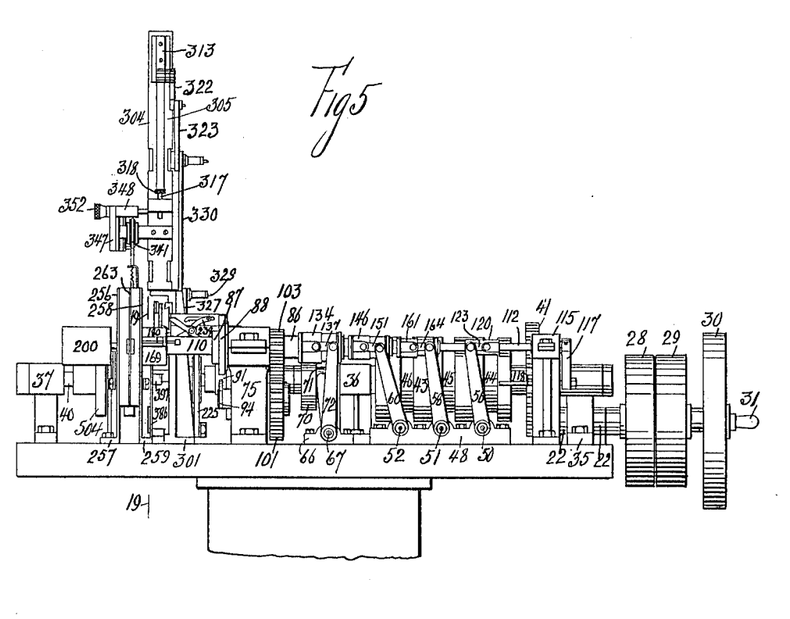
Fig. 5 represents a right hand end view of Fig. 1.
Figures 6, 7:
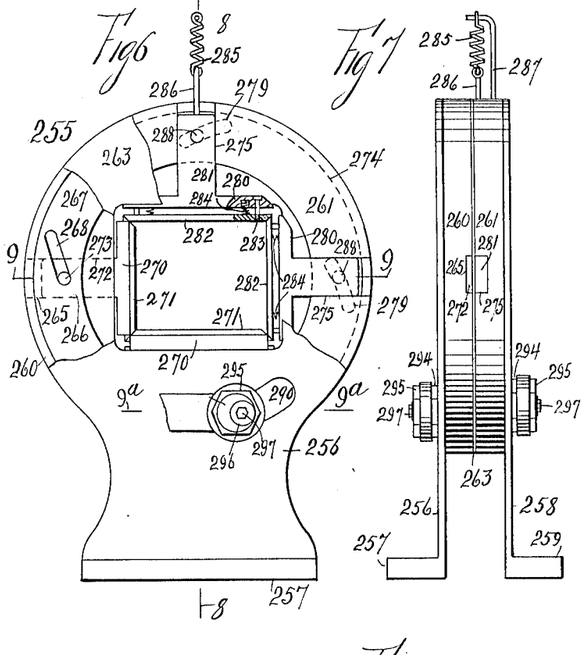
Fig. 6 shows an enlarged front view of the closer with portions thereof in sections and other portions broken away.
Fig. 7 is a right hand end view of Fig. 6.
Figure 8:
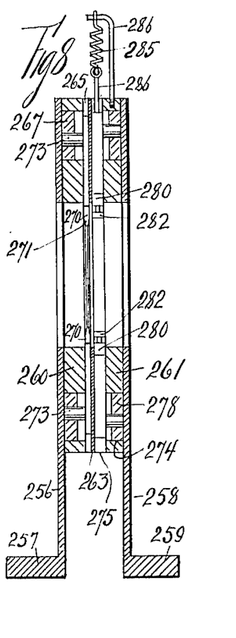
Fig. 8 represents a section of Fig. 6 on the line 8, 8.
Figure 9:
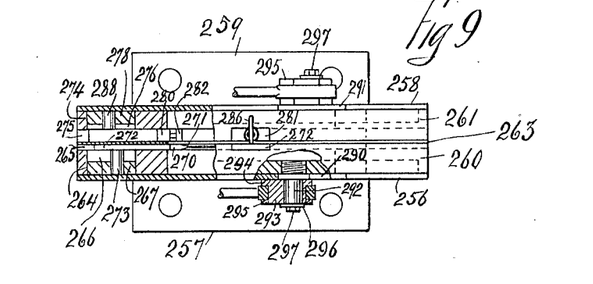
Fig. 9 shows a top plan view of Fig. 6 with partial sections on the lines 9, 9 and 9ª. 9ª.
Figure 10:
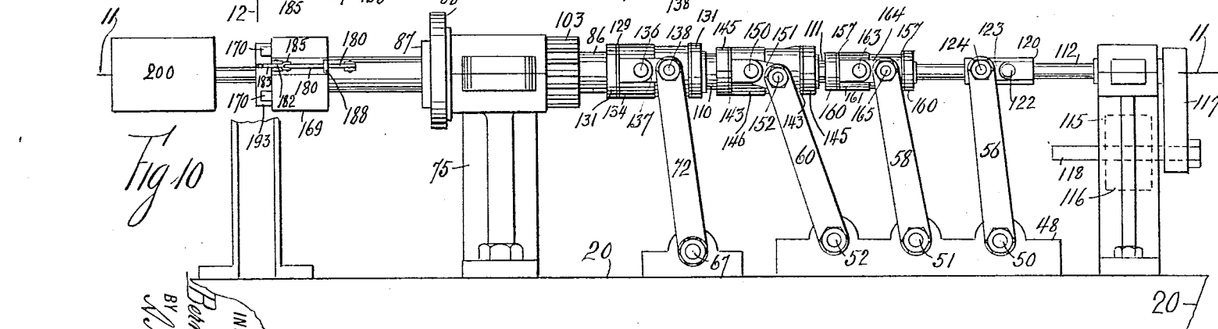
Fig. 10 shows an enlarged partial portion of Fig. 5.
Figure 11:
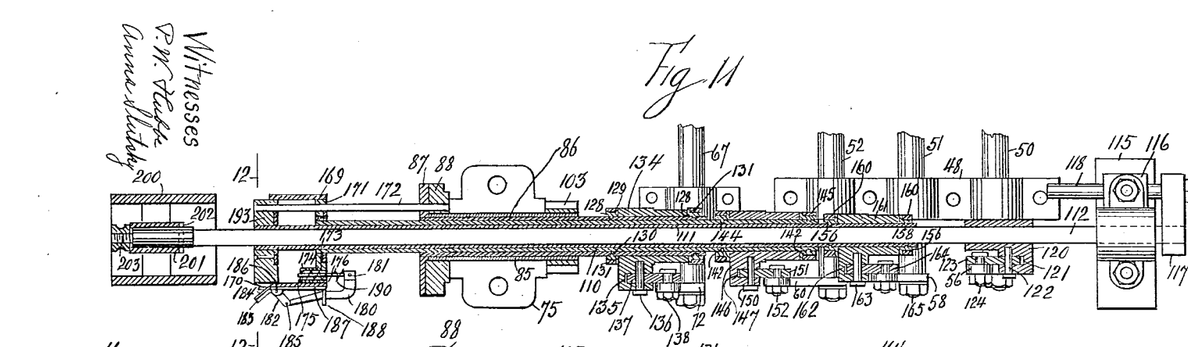
Fig. 11 represents a section of Fig. 10 on the line 11, 11.
Figure 19:
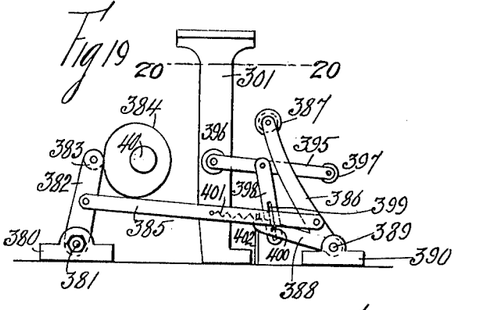
Fig. 19 shows an enlarged fragmentary section of Fig. 5 on the line 19, 19.
Figure 20:
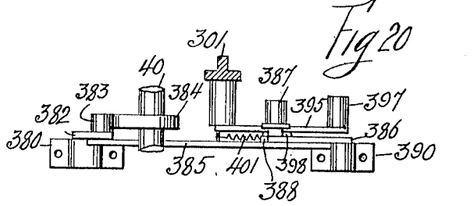
Fig. 20 represents a top plan view and section of Fig. 19 on the line 20, 20.

An important novelty of the construction of the appurtenances connected with the forming rollers 387 and 397, allows one of them to remain in contact with the strip of card board while forming the neck against the face of one of the sides of the forming block, while the other roller is in contact with a corner of the neck adjacent to one of the corners of the forming block. This result is obtained by the movements of the pin 400 of the arm 388 in the elongated opening 399 in the link 398. From an inspection particularly of Figs. 3 and 19, it will be seen that when a corner of the forming block 193 lowers the roller 387, the roller 397 remains in contact with the strip on one of the faces thereof, and also when the forming roller 397 comes in the path of one of said corners the roller 387 remains in contact with the strip of card board against one of the faces of the forming block.

Having described my invention what I desire to secure by Letters Patent and claim is:

1. In a neck making machine the combination of a forming block for a strip of material, means to turn the block, means to reciprocate the block, a guide box for said block, fingers on the box to guide and support said strip and means on the block to clamp the strip of material in place.

2. In a neck making machine the combination of a forming block for a strip of material, a guide box slidably connected to the block, means to turn the block and box, a pair of fingers extending from the box, a catch located in a cavity in the block and normally extending through one of the sides thereof, a swinging heel hinged to the box and means to swing it parallel to one of the sides of the block to clamp strips of material thereto.

3. In a neck making machine the combination of a disk, means to rotate the disk, means to lock the disk in operative position, a disk toe located to lock with said disk, a guide box with its longitudinal axis coincident with the longitudinal axis of said disk, a forming block slidably supported in the box, a toe hinged on the box to clamp a strip of material against said block, a plunger carried on the box in the path of said disk toe, an arm for the toe that is hinged to the box and a lever connecting said arm and said plunger 4. In a neck making machine the combination of a journal bracket, a sleeve journaled therein, a pinion fastened to one end of the sleeve and a disk fastened to the other end thereof, an outer sleeve journaled in said sleeve, means to reciprocate the latter sleeve, a disk toe normally locked with said disk, means to lock the disk in operative position, a second sleeve slidably supported in the said outer sleeve, means to reciprocate the second sleeve, a guide box connected to the second sleeve, a connection between the disk and box to rotate the latter, a third sleeve within the second sleeve, a forming block fastened to the third sleeve and means to reciprocate the third sleeve.

5. In a neck making machine the combination of a journal bracket, a sleeve journaled therein, a pinion fastened to one end of the sleeve and a disk fastened to the other end thereof, an outer sleeve journaled in said sleeve, means to reciprocate the latter sleeve, a toe normally locked with said disk, means to lock the disk in operative position, a second sleeve slidably supported in the said outer sleeve, means to reciprocate the second sleeve, a guide box connected to the second sleeve, a connection between the disk and box to rotate the latter, a third sleeve within the second sleeve, a forming block fastened to the third sleeve, means to reciprocate the third sleeve, a connection between the forming block and said disk, a plunger rod within the third sleeve, means to reciprocate the rod and a carrier connected to said rod.

6. In a neck making machine the combination of a forming block for a strip of material, means to turn said block, means to glue a paper band to the strip of material during the turning of the block, a closer adjacent to the block, means to move the block with its strip and band into said closer, reciprocating bending bars in the closer to bend the band over the edge of the strip, reciprocating pressing bars in the closer to bear against the band and strip on the outer surface of the band to set the paste between said band and strip, and a carrier to remove the formed strip or neck from the closer.

7. In a neck making machine the combination of a forming block for a strip of material, means to turn the block, means to glue a paper band to the strip of material during the turning of the block, a closer adjacent to the block, means to move the block with its strip and band into closer, a pair of rings with elongated openings in the closer, means to move the rings about their axial centers, means to vary the movements of the rings, pressing bars actuated by one of the rings, bending bars actuated by the other ring and a carrier coacting with the said bars.

8. In a neck making machine the combination of a forming block for a strip of material to make a neck, means to turn the block, means to paste or glue a paper band to the strip of material during the turning of the block, a closer adjacent to the said block, a pair of rings with elongated openings in the closer, a pair of arms pivoted in the machine, a roller journaled on each arm, a cam for each roller, and connecting rods connecting said arms and rings.

9. In a neck making machine the combination of a forming block for a strip of material to make a neck, means to turn the block, means to paste or glue a paper band to the strip of material during the turning of the block, a closer adjacent to the said block, a pair of rings with elongated openings in the closer, an adjustable disk eccentrically connected to each ring, a pair of arms pivoted in the machine, a roller journaled on each arm, a cam for each roller and connecting rods connecting said arms and rings.

10. In a neck making machine the combination of a rectangular forming block, means to turn the block, means to reciprocate the block, a pair of forming rollers pivoted in the machine to bear on a piece of material carried by said block, means to maintain either of said rollers against said material while the other roller is in contact with the portion of said material that bears against one of the corners of the forming block.

11. In a neck making machine the combination of a forming block, a bell crank pivoted in the machine, a forming roller journaled to one arm of the bell crank, a lever pinned to the machine, a second forming roller journaled to said lever, a link having an elongated opening with one end pinned to said link, a pin extending from the other arm of the bell crank and engaging said opening to allow the forming rollers to move independently with respect to each other.

Signed at the borough of Manhattan in the county of New York and State of New York this sixth day of February A. D. 1912.

BERNARD ROUS.

Witnesses:
A. A. DE BONNEVILLE,
E. J. TINSDALE.

---

Copies of this patent may be obtained for five cents each, by addressing the "Commissioner of Patents, Washington, D. C."